Figure 3:
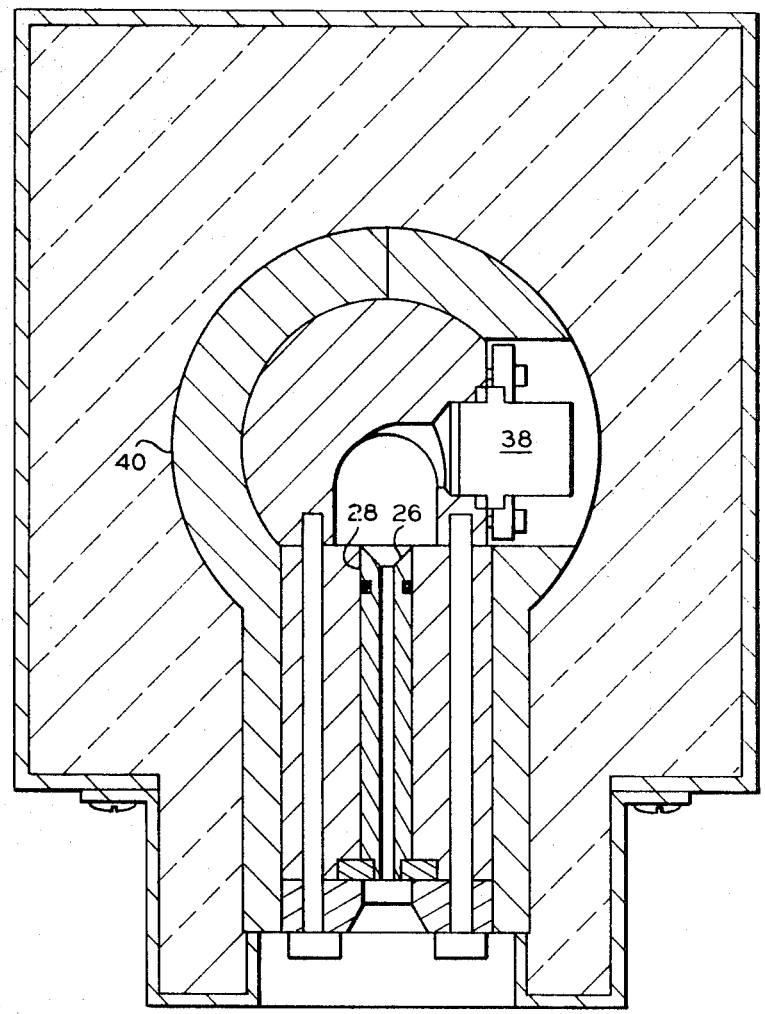

United States Patent

[11] 3,595,305

| [72] | Inventors | Richard O. Welty;<br>Floyd H. McGinnis, Tulsa, both of, Okla. |
|---|---|---|
| [21] | Appl. No. | 3,790 |
| [22] | Filed | Jan. 19, 1970 |
| [45] | Patented | July 27, 1971 |
| [73] | Assignee | Phillips Petroleum Company |

[54] MELT RHEOMETER
5 Claims, 4 Drawing Figs.

[52] U.S. Cl. .................................................... 165/47,
161/185, 73/56
[51] Int. Cl. .................................................... F24h 3/00

[50] Field of Search.................................................. 165/47,
185, 186; 73/56

[56] References Cited
UNITED STATES PATENTS
3,252,320 5/1966 Welty............................ 73/56

*Primary Examiner*—Charles Sukalo
*Attorney*—Young and Quigg

ABSTRACT: An improved melt rheometer having a power transmission, a plurality of orifice elements, and an improved heater block for increasing the operating range and accuracy of the apparatus.

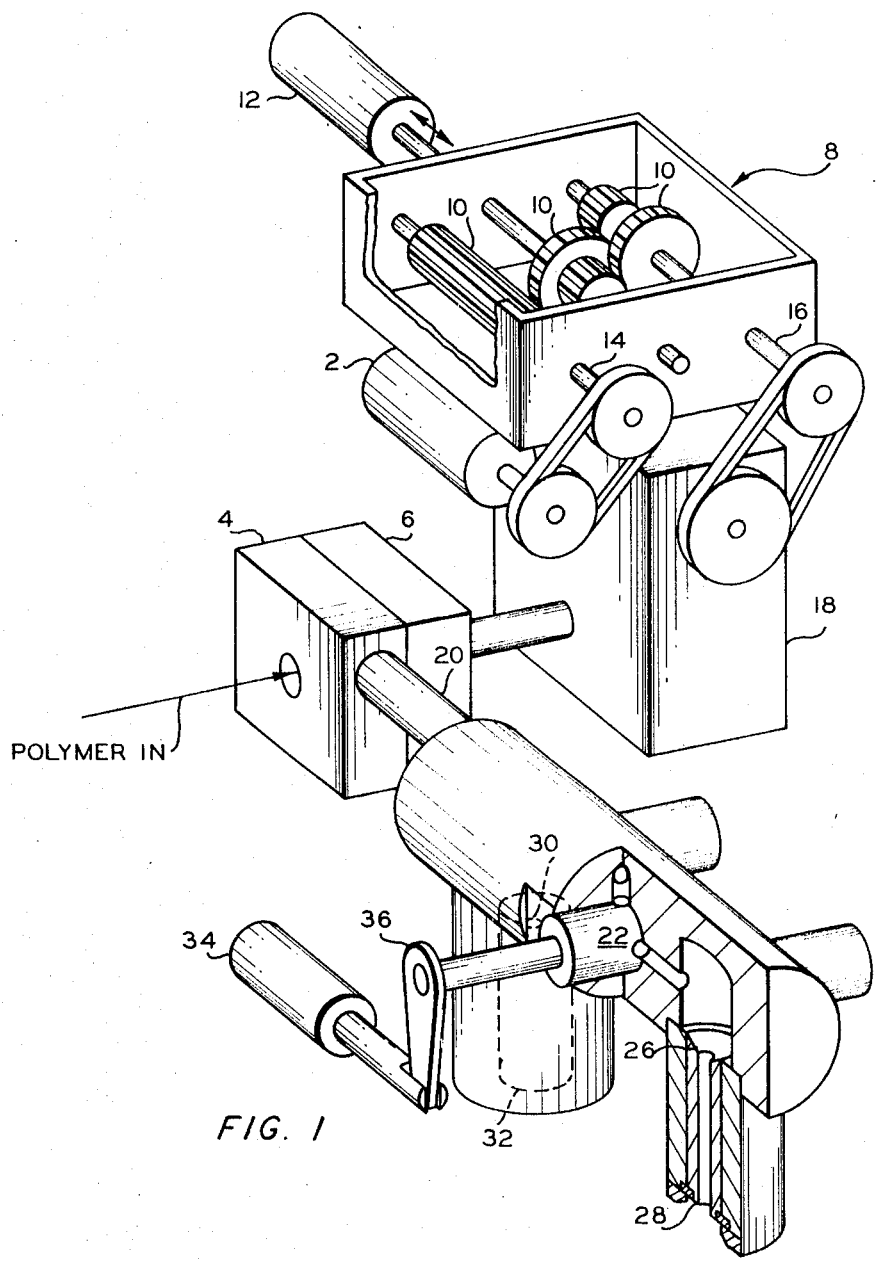
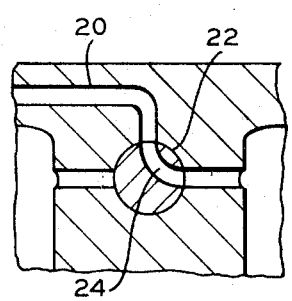
FIG. 1
FIG. 2
INVENTORS
R. O. WELTY
F. H. McGINNIS
BY Young & Quigg
ATTORNEYS

PATENTED JUL 27 1971 3,595,305

SHEET 2 OF 2

INVENTORS
R. O. WELTY
F. H. McGINNIS
BY
Young & Quigg
ATTORNEYS

MELT RHEOMETER

This invention resides in an improved melt rheometer. In another aspect, this invention resides in an improved melt rheometer that has a plurality of constant pumping speeds, improved temperature control, and is capable of operating at higher pressures and over a broader pressure range.

Melt rheometers are used to determine the flow characteristics of polymers at various temperatures and pressures. These rheometers are often utilized for product control during the manufacture of polymers and articles from the polymer.

Heretofore used melt rheometers have been limited to a very few constant flow rates and to relatively low pressures. Owing to these factors, these previously used melt rheometers have been incapable of determining shear stresses of the polymer at the higher shear rates. This inability to obtain rheological properties of the polymer at a plurality of higher shear rates has heretofore made it impossible to properly control the article forming material and apparatus. Often the forming apparatus was functioning at shear rates above that capable of being reproduced by the melt rheometers. With the heretofore used melt rheometers the rheological properties of the polymer could not be easily determined at a sufficient number of points to provide the control information needed where controls were altered for the manufacture of different articles or where different forming apparatus was to be incorporated, for example. As known in the art, polymers used for forming articles have rheological properties that are nonlinear with shear rate.

It is therefore an object of this invention to provide a melt rheometer that will operate over an increased range. Another object of this invention is to provide a melt rheometer that has a plurality of constant pumping speeds. Yet another object of this invention is to provide a melt rheometer that has improved temperature control. A further object of this invention is to provide a rheometer that is capable of operating at higher pressures and over a broader pressure range. Other aspects, objects, and advantages of the present invention will become apparent from a study of the disclosure, the appended claims, and the drawing.

Figure 4:
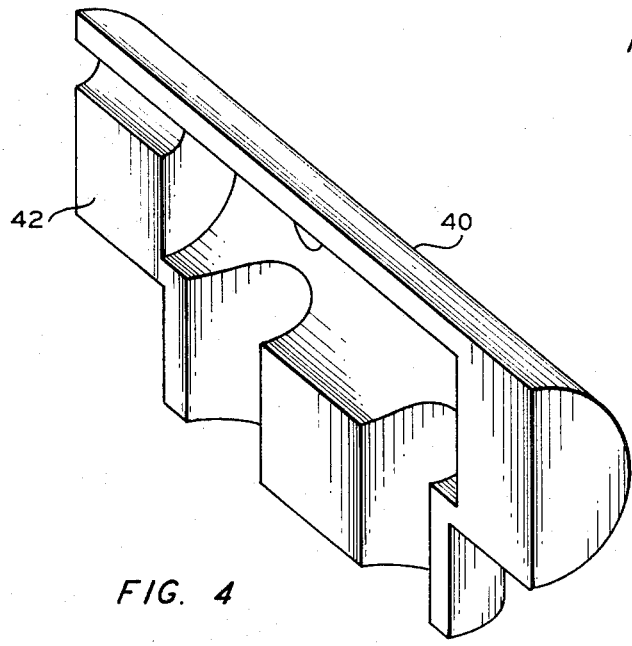

The drawings are views of the melt rheometer of this invention. FIG. 1 is an isometric view in partial section of the melt rheometer, FIG. 2 is a diagrammatic partial section of the valve element, FIG. 3 is a diagrammatic longitudinal section of an orifice element and fluid passway therethrough, and FIG. 4 is an isometric view of one portion of a heat transfer block.

FIG. 1 shows the melt rheometer which has a power source 2 such as an electric motor, a heater 4 for receiving polymer from a polymer reservoir and heating said polymer, and a positive displacement pump 6 for pumping heated polymer from the heater.

The pump 6 is connected and driven by the power source 2 through a transmission 8. The transmission 8 has a plurality of different size gears 10. An actuator 12 is associated with the gears 10 for changing the speed ratio between the driving shaft and the driven shaft 16. THe driven shaft of the transmission 8 is operably connected to the pump 6 through a gear reducer 18. By connecting the power source 2 to the pump 6 through a transmission 8, the pump can be selectively driven at a plurality of substantially constant speeds for increasing the range of polymer flow rates through the apparatus.

Heated polymer discharges from the pump 6 and block 4 into conduit 20 which provides a pathway for the passage of polymer from the block 4 to a valve element 22. The valve element 22 has an angled fluid pathway 24 (better seen in FIG. 2) formed therethrough and is movable between a first position at which the fluid pathway 24 of the valve element 22 is in communication with a polymer stream discharging from the pump 6 and in communication with an inlet end 26 of the first orifice element 28 for the passage of fluid polymer through said first orifice element 28 and a second position at which the fluid pathway 24 of the valve element 22 is in communication with the polymer stream discharging from the pump 6 and in communication with an inlet end 30 of a second orifice element 32 for the passage of polymer through said second orifice element 32. A valve actuator 34 is connected through linkage 36 to the valve element 22 for movement of the element 22 between the first and second positions.

FIG. 3 shows, for example, the orifice element 28 with a pressure transducer 38 in communication with a polymer stream flowing from the valve element 22 to the orifice element. Each orifice element 28, 32 has a separate associated pressure transducer for delivering a signal to a controlling and recording apparatus (not shown) representative of the pressure of the adjacent polymer stream. The pressure transducers are of different range in order that the pressure of the polymer stream can be more accurately measured when the pump is operating at high discharge rates. The preferred range of operation of each transducer is dependent upon the desired range at which the apparatus is desired to be operated. One useful pressure transducer combination for use with this apparatus has been found to be 0—500 p.s.i. and 0—5000 p.s.i. At such preferred high pressure ranges, at least one of the orifice elements 28 or 32 and the associated elements of the apparatus must be of sufficient strength to withstand a polymer pressure of preferably at least 5,000 p.s.i. It has been found that the construction of a melt rheometer must be able to withstand pressures of at least 5,000 p.s.i. or sufficient rheological property characteristics of a polymer (as previously described) can not be obtained. By so constructing the valve element and first and second orifice elements 28, 32 with differing size transducers, it has been found that more accurate pressure measurements can be made on the polymer that is flowing at higher pressures and over a broader pressure range.

A heat transfer block 40 (better seen in FIG. 4) is in contact with the conduit 20 and the first and second orifice elements 28, 32 over substantially the entire length of each of said orifice elements 28, 32. Since in the measurement of the rheological properties of a polymer, it is of critical importance to maintain the polymer at a substantially constant temperature, it is preferred that the heat transfer block be formed of metal, have a thermal conductivity at room temperature greater than 100 B.t.u. per hour per square foot per degree F. per foot and be comprised of not greater than a first and second portion with each portion having a contacting surface with the plane of said contacting surfaces extending along the pathway of the fluid moving through the apparatus. It has been found that for a heating block formed of material having lower thermal conductivity and more and differently positioned contacting surfaces, the temperature of the polymer varies over a wider range thereby decreasing the accuracy of the apparatus. Heating bands and other apparatus can be associated with the heating block 40 in order to facilitate controlling the temperature of the polymer.

In the operation of the apparatus of this invention, polymer is heated to a preselected temperature and discharged by the pump 6 at a constant rate through the conduit 20, the valve element 22, and the first orifice element 28, for example. The pump speed of the positive displacement pump 6 is accurately maintained, thereby passing polymer through the first orifice element 28 at a known rate and temperature and at a pressure that is measured by the associated pressure transducer 38 which, for example, has a range 0—500 p.s.i. After the pressure has been recorded at that particular polymer stream flow rate for a desired length of time, for instance the time it takes the pressure to stabilize after switching to this speed and pressure cavity, the pump speed is changed by controlling the motor speed as known in the art and the pressure at the new pump rate is also recorded for a desired length of time. The motor speed is, for example, intermittently increased until the motor is operating at the desired maximum speed and polymer pressures have been recorded at that speed. In order to obtain rheological properties of the polymer at higher shear rate the actuator 12 is energized and the gears 10 of the transmission 8 are moved to provide a higher driven shaft 16 to driving shaft 14 speed ratio, thereby operating the pump at, for example, a higher speed for the same motor speed. The valve actuator 34 is simultaneously energized to pass polymers through the second orifice element 32 in contact with its associated transducer which, for example, has a range of 0—5,000 p.s.i. As previously described, the motor speed can be regulated as known in the art to change the pumping speeds within this generally higher speed range and measure the polymer pressure at a plurality of flow conditions.

The transmission is herein described and illustrated as having two speeds, but the apparatus can be constructed to have a transmission with a plurality of speeds and there can likewise be more than two orifice elements through which to pass polymer with associated pressure transducers and obtain pressure data. By constructing the apparatus as herein described for example purposes, it has been found that a polymer pressure can be obtained more accurately, at higher pressures and over a wider range, thereby permitting the operator to obtain a sufficient amount of data to more comprehensively calculate the rheological properties of a polymer and better control the manufacture of polymer or articles from said polymer. Other modifications and alterations of this invention will become apparent to those skilled in the art from the foregoing discussion and accompanying drawing, and it should be understood that this invention is not to be unduly limited thereto.

What we claim is:

1. In an improved continuous melt rheometer having a power source, a polymer reservoir, a heater for heating the polymer, a positive displacement pump for pumping the heated polymer, first and second separate orifice elements, a fluid pathway means connecting the pump to the first and second orifices for the passage of polymer from the pump to and through the orifice elements, and a separate pressure transducer associated with each orifice element, the improvement comprising:

a transmission having a plurality of different size gears and being connected to the power source and the pump for selectively driving the pump at a plurality of substantially constant speeds;

a heat transfer block contacting the fluid pathway means and the first and second orifice elements over substantially the entire length of each of said orifice elements; and means for selectively and separately directing the polymer discharging from the pump through a single orifice element.

2. An apparatus, as set forth in claim 1, wherein the means for selectively and separately directing the polymer discharging from the pump through a single orifice element comprises a valve element having an angled fluid pathway formed therethrough and being movable between a first position at which the fluid pathway of the valve element is in communication with a polymer stream discharging from the pump and in communication with an inlet end of the first orifice element and a second position at which the fluid pathway of the valve element is in communication with the polymer stream discharging from the pump and in communication with an inlet end of the second orifice element and means for selectively moving the valve element between the first and second position.

3. An apparatus, as set forth in claim 1, wherein the heat transfer block is formed of metal having a thermal conductivity at room temperature greater than 100 B.t.u./hr./ft.$^2$/° F./FT.

4. An apparatus, as set forth in claim 1, wherein the heat transfer block is formed of metal and comprises not greater than a first and a second portion with each portion having a contacting surface with the plane of said contacting surface extending along the pathway of the fluid moving through the apparatus.

5. An apparatus, as set forth in claim 1, wherein at least one of the orifice elements and the associated elements of the apparatus are of a strength sufficient to withstand a pressure of at least 5,000 p.s.i.